INVENTOR.
HANS M. SCHAPPERT

United States Patent Office 3,399,185
Patented Aug. 27, 1968

3,399,185
PREPARATION OF POLYETHYLENE HAVING IMPROVED OPTICAL PROPERTIES
Hans M. Schappert, Bethel Park, Pa., assignor to Koppers Company, Inc., a corporation of Delaware
Filed Mar. 1, 1965, Ser. No. 436,125
6 Claims. (Cl. 260—94.9)

ABSTRACT OF THE DISCLOSURE

Ethylene is polymerized to polyethylene, having improved optical properties, in a high pressure, free radical type process whereby the telogen concentration throughout a tubular polyethylene reactor is maintained essentially constant.

---

Ethylene is polymerized by the heating of ethylene under controlled temperatures and pressures in the presence of catalytic amounts of free radical yielding catalysts such as oxygen or organic compounds that decompose at or below the polymerization temperature to generate free radicals. The density and molecular weight of the polymer produced, as reflected by the melt index, is a function of the temperature and the pressure at which the ethylene is polymerized. The density and the molecular weight of the polymer determines the use to which a particular ethylene polymer can be put. Thus, it is particularly important that the melt index be properly controlled.

Conventionally, control of the melt index is accomplished by polymerizing the ethylene in the presence of a chain transfer agent or telogen, for example a lower alkane such as butane. Chain transfer involves the termination of growing polymer chains and the inhibiting of chain branching thus limiting the ultimate molecular weight of the material.

The melt index of the product polymer can be controlled by varying the amount of chain transfer agent present during the polymerization, usually by mixing varying amounts of chain transfer agent with the ethylene gas prior to polymerization. Polymers produced in the presence of chain transfer agents are characterized by certain improvements in physical properties such as processability, haze, density, stiffness, yield point, film draw and tear strength.

In a conventional operation, the ethylene, containing catalyst and a predetermined amount of telogen, is introduced into the first portion of a tubular reactor where it is heated to initiate polymerization. Thereafter, the polymerization is an exothermic reaction and it is necessary to cool the succeeding portions of the reactor to maintain a constant maximum temperature. Depending upon specific reaction conditions, e.g., the maximum temperature and pressure, 10–16 percent of the ethylene fed to the reactor is converted to polyethylene for each pass through the reactor. The ethylene and polyethylene are removed at the end of the reactor and most of the nonconverted ethylene is recycled to the reactor. Since ethylene has been converted to polyethylene, accordingly, fresh ethylene is also continuously added so that the ethylene throughput through the reactor is maintained.

It has been found that the telogen concentration does not remain constant throughout the reactor but increases as the reaction proceeds. The reason for this increase is that while a portion of from 10–16 percent of the ethylene is polymerized to polyethylene the polyethylene contains only about ½ mole of telogen per mole of polymer. Thus the telogen itself is not measurably consumed and the remaining ethylene has a higher telogen content. This change in telogen level throughout the reactor is sufficient to cause a considerable spread in the molecular weight distribution of the product polymer. The lower telogen concentrations existing at the front end of the reactor produce a low melt index polymer (high molecular weight) whereas at the higher telogen concentrations at the outlet end of the reactor produce high melt index polymer (low molecular weight). The tendency of the lower temperatures at the front end of the reactor to produce low melt index material enhances this result. Thus, the polymers of high and low melt index may have an average melt index that is apparently suitable for a particular purpose and yet have a wide spread in molecular weight distribution. The physical properties of the product polymer, as measured by the haze value which is a function of the "see-through" properties of the polymer, are, for example, adversely affected by a wide molecular weight range. The haze value is critical for polyethylene film packaging applications; the film must appear transparent or it cannot be used for packaging. This requires a haze value of 15 or below. Under normal operating conditions haze values of 20 or higher frequently occur. To make such a product usable for film applications it must be further refined, for example by milling.

The haze value can be related to the term $M_w/M_n$ as shown in the graph of FIG. 1. The term $M_w/M_n$ is a measure of the degree of long chain branching in the polymer where $M_w$ is the weight average molecular weight and $M_n$ is the number average molecular weight. The value of the weight average molecular weight is strongly influenced by the high molecular weight material present whereas the value of the number average molecular weight is strongly influenced by the low molecular weight material present. Therefore, the term $M_w/M_n$ is a direct function of the molecular weight distribution and as the ratio decreases it indicates a narrowing of the molecular weight distribution. As seen from the graph, as the ratio decreases so does the haze value.

In accordance with this invention, polyethylene having improved optical properties is produced by maintaining the telogen concentration throughout a tubular polyethylene reactor essentially constant. The ethylene feed is divided into two portions. One portion containing the desired telogen concentration for the polymerization is introduced into the inlet end of the reactor. The second portion containing a lower concentration of telogen is injected into the reactor at successive spaced points along the reactor. Then as the telogen concentration in the unpolymerized ethylene tends to rise due to the conversion of a part of the ethylene to polyethylene, the subsequent additions maintain the telogen concentration essentially constant.

Advantageously, the method of controlling the telogen concentration of this invention can be used in conjunction with the cold gas injection and the novel liquid catalyst injection systems described respectively in copending applications, Ser. No. 839,129 and now abandoned and Ser. No. 347,585 that are assigned to the assignee of this invention.

It is preferred in accordance with this invention to operate at the highest practical pressures because higher conversions and improved product properties can be obtained at such pressures. The reaction pressure may range between 15,000 and 50,000 p.s.i.g. and is dictated to a great extent by the density requirements of the polyethylene being produced. The higher density polymers usually require higher pressures. Excellent results are obtained at pressures between 20,000 and 35,000 p.s.i.g. The upper limit of the reaction pressure is determined by the mechanical strength of the equipment such as the reactor tubes and the compressor etc.

The temperature to be used in this invention is usually dictated by the properties being desired in the final product. The temperature of the reaction affects the properties of the polymer, and the maximum operating temperature or peak temperature affects the rate of reaction. In the process of the invention, excellent results are obtained with a peak temperature in the range of 220–300° C. although higher conversions are obtained in the upper portion of the range. The use of lower temperatures provides a product of higher density. To initiate the polymerization the ethylene is heated to a temperature of from 120–190° C. depending upon the catalyst which is employed.

The concentration of catalyst present during the polymerization can be used to maintain a desired reaction temperature. The exact amounts of catalyst required to reach a given temperature varies with the polymerization pressure. At pressures in the range of 15,000–23,000 p.si.g. about 3–15 parts by weight per million based on the ethylene of catalyst are used. When the pressures reach the 35,000 p.s.i.g level only 0.1–2.5 parts per million catalyst are required.

A liquid catalyst component is advantageously used as the primary catalyst in the practice of the invention. Useful liquid catalysts include any normally liquid or organic free radical generating catalysts or normally solid organic free radical generating catalysts dissolved in a suitably substantially inert organic solvent. Particularly useful catalysts are peroxidic compounds such as lauroyl peroxide, diteritarybutyl peroxide, diisopropylperoxy dicarbonate, diethyl peroxide, dimethyl peroxide, tertiarybutyl hydroperoxide, azo catalysts, such as azobisisobutyronitrile, and oximes, such as acetoxime.

The liquid catalyst component is usually, but not necessarily, dissolved in a substantially inert organic liquid diluent. Aliphatic and aromatic hydrocarbons are preferred diluents; benzene is an excellent medium for the catalyst in the production of consistently high quality polyethylene. Other useful diluents include hexane, cyclohexane, toluene, heptane, solvent naphtha and the like. When an inert diluent is used as a carrier for the catalyst, the catalyst comprises from about 1–50 mole percent of the total solution.

Telogens useful in the practice of the invention include lower alkanes, e.g., methane, ethane, propane, butane, olefins, e.g., butene-1, butene-2, and cyclic alkanes, e.g., cyclohexane and hydrogen. The telogen is employed in concentrations between 0.5–10 percent by volume based on ethylene. The amount of telogen employed is chosen so as to provide a product having the desired molecular weight and therefore the desired physical properties for a particular end use. Ethylene polymers having a 0.2 melt index (high molecular weight) are used for wire coating; those having a melt index of 1.5–2 are suitable for the production of film; and those of a melt index of 8–40 (low molecular weight) are molding grade and paper coating materials. The high molecular weight material is produced at the lower telogen concentrations.

In the novel process, only the recycle gas which already contains the desired concentration of telogen for the polymerization is fed to the inlet end of the reactor. The fresh ethylene which replaces the ethylene converted to polyethylene is mixed with an amount of telogen such that the fresh ethylene has a smaller concentration of telogen than the recycle gas. The fresh ethylene stream is then subdivided as required, mixed with catalyst, and injected at selected points along the reactor. If desired, fresh ethylene can be mixed with and introduced with the recycle gas. In this case, the amount of telogen added to the fresh ethylene is adjusted accordingly so as to give the desired telogen concentration. The weight ratio of recycle gas fed to the reactor inlet to the fresh ethylene stream is between 9:1 and 1:5. The number of injection points will range between 2 and 10 depending upon the ratio employed.

The above and further objects and novel features of the invention will appear more fully from the following detailed description when the same is read in connection with the accompanying drawings. It is to be expressly understood, however, that the drawings are not intended as a definition of the invention but are for the purpose of illustration only.

Figure 2:
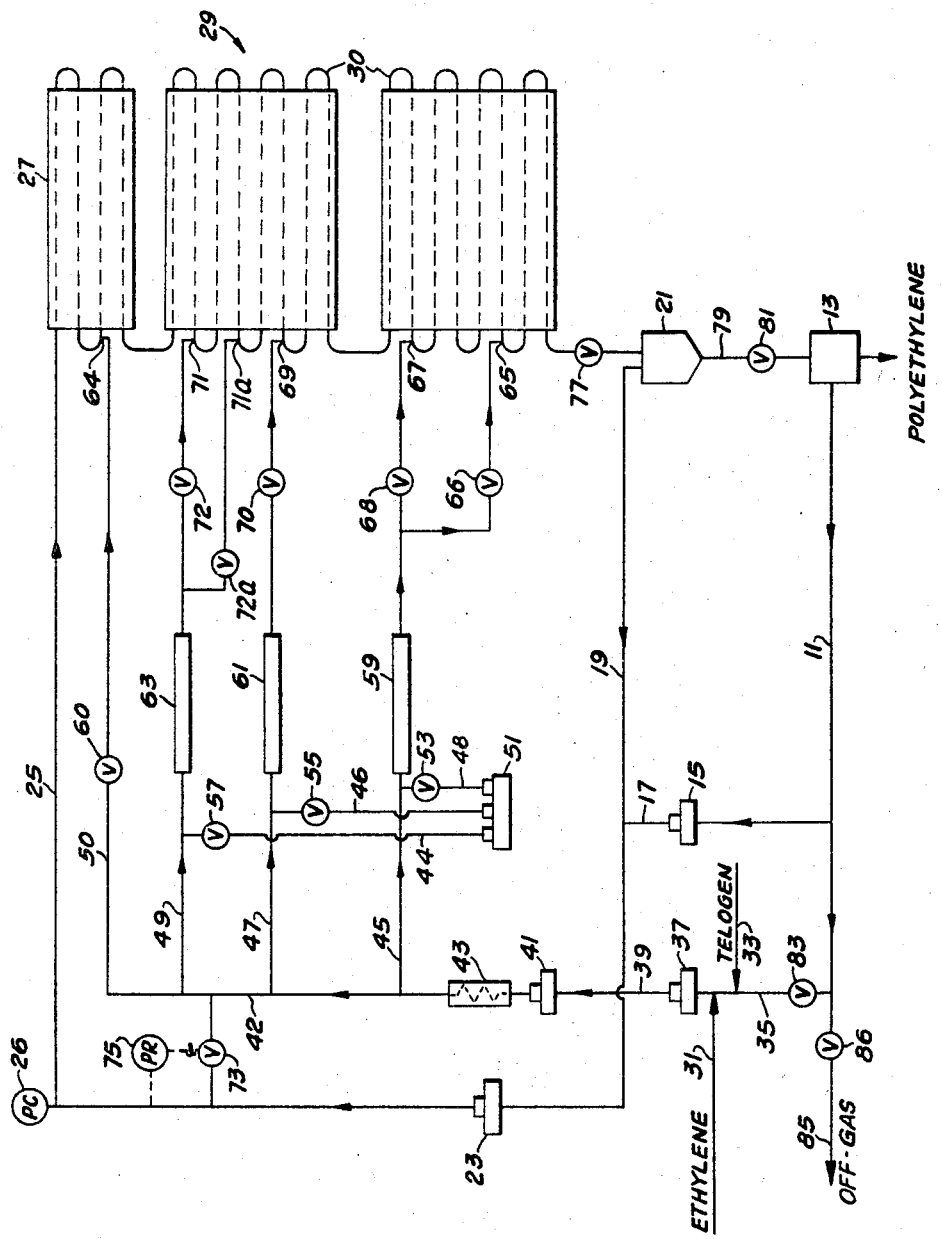
FIG. 2 is a schematic diagram of the overall process of the invention.

Referring now to FIG. 2, recycle ethylene flows from the low pressure catch pot 13 through line 11 to compressor 15 and then through line 17 to line 19 where it mixes with the high pressure recycle ethylene from a high pressure catch pot 21. The recycle stream is then compressed in hypercompressor 23 to the reaction pressure and flowed through line 25 to the preheater section 27 of reactor 29. The pressure in line 25 is controlled by pressure controller 26.

Fresh ethylene by way of line 31 from a source (not shown) and a telogen by way of line 33 mix in line 35 and flow to precompressor 37, and through line 39 to hypercompressor 41 where the mixture is compressed to the reaction pressure, and then through cooler 43 where the mixture is cooled to between about 0° and 50° C. The fresh ethylene stream is then divided into four streams 45, 47, 49 and 50.

In the embodiment shown, catalysts, and inert diluent carrier if desired, are fed from suitable storage tanks (not shown) through liquid catalyst pump 51. Fresh ethylene streams 45, 47 and 49 are joined with liquid catalysts from streams 44, 46 and 48, the flow of catalyst being started by opening valves 53, 55 and 57. The ethylene in line 50 contains no catalyst, its purpose being to permit the maintenance of constant temperature conditions in the reactor as described in copending application, Ser. No. 347,585. The fresh ethylene in lines 45, 47 and 49 now containing telogen and catalyst passes through sparger mixers 59, 61 and 63 illustrated in detail in application, Ser. No. 347,585 to provide a substantially uniform dispersion of finely divided droplets of liquid catalyst in the fresh ethylene. The fresh ethylene containing a telogen is then injected into tubes 30 of reactor 29 at injection points 64, 65, 67, 69, 71 and 71a.

The exact amount of catalyst, telogen and ethylene that is introduced into reactor 29 is automatically controlled by the valves 60, 66, 68, 70, 72 and 72a. The relative pressure between the recycle ethylene and the fresh ethylene stream in lines 25 and 42 respectively is controlled by valve 73 which is operated by pressure regulator 75.

Ethylene continues to polymerize throughout reactor 29 but not all the ethylene polymerizes. The mixture of ethylene gas and polymer are released through high pressure letdown valve 77 to high pressure catch pot 21. Most of the unconverted ethylene gas and telogen is separated from the polymer and directed back to the reactor through high pressure recycle line 19. The polyethylene and remaining ethylene and telogen is then released into low pressure catch pot 13 through line 79 by means of valve 81. The remaining ethylene and telogen is separated from the polymer and is returned through line 11 to precompressor 15. A portion of the low pressure recycle ethylene can be mixed with the fresh ethylene in line 35 by opening valve 83. A portion of the recycle ethylene is released as off-gas through line 85 by means of valve 86 to remove impurities which would otherwise build up in the system.

The polyethylene is recovered from the catch pot 13 and is then ready for further processing.

As an illustration of the invention, ethylene was polymerized at a pressure of 23,000 p.s.i.g. in a tubular reactor such as illustrated in FIG. 2. A total of 9,000 pounds of ethylene was passed through the tubular reactor per hour. Of this total, 6,000 lbs./hr. was recycle ethylene from the high pressure catch pot 21 which was fed to the preheater section 27 of the reactor. The remaining 3,000 lbs./hr. of ethylene consisting of 1,400 lbs./hr. of fresh ethylene and 1,600 lbs./hr. of recycle ethylene from the low pressure catch pot 13 was cooled to 50° C. in cooler 43 and injected at selected spaced injection points along the reactor. Peroxide catalysts, hereinafter described, were mixed with the cold gas portions of the ethylene feed prior to their injection into the reactor in sufficient amounts to maintain a maximum operating temperature in the reactor at 250° C. The total catalyst added to the reactor corresponded to 5 parts by weight per million based on the total throughput of ethylene.

Fresh ethylene was fed to line 35 at the rate of 1,400 lbs./hr. (17,600 standard cubic feet per hour) where it was mixed with 1,600 lbs./hr. (20,180 standard cubic feet per hour) of recycle gas coming from line 11 and containing 74.5 lbs./hr. (462 standard cubic feet per hour) of butane. Fresh butane in an amount of 11.6 lbs./hr. (72.2 standard cubic feet per hour) was added to line 35 through line 33 to give a total butane concentration in the cold gas being fed to precompressor 37 of 1.42 volume percent. The recycle ethylene from the high pressure catch pot 21 was fed by line 19 to hypercompressor 23 where it was compressed to a pressure of 23,000 p.s.i.g. The recycle ethylene in line 25 in an amount of 6,000 lbs./hr. throughput contained 2.29 volume percent butane which was the butane concentration of the ethylene at the reactor outlet. The recycle ethylene in line 25 was fed to the preheater section 27 of reactor 29 at a temperature of approximately 80° C. In the preheater section 27, the temperature of the feed gas stream was raised to approximately 155° C. by means of water in a water jacket which is not shown.

The cold gas portion of the ethylene feed in line 39 after being cooled in cooler 43 to 50° C. was split into four streams 45, 47, 49 and 50. The ethylene in line 50 to which no catalyst was added was introduced into the second tube in the preheater section of the reactor at injection point 64 in an amount of 350 pounds of ethylene per hour. Liquid peroxide catalyst in reservoirs (not shown) were pumped through lines 44, 46 and 48 by means of liquid catalyst pump 51 and injected into lines 45, 47 and 49. A first catalyst (t-butyl peracetate as a 3 weight percent solution in benzene) was injected at a rate of 0.52 lb./hr. into the ethylene stream 49 which consisted of a flow rate of 1,250 lb./hr. of ethylene. The ethylene in line 49 containing the catalyst was then passed through sparger mixer 63 which caused the liquid catalyst to become evenly dispersed in the form of fine droplets in the ethylene. The ethylene in line 49 was then divided into two portions and fed into the reactor 29 at injection points 71 and 71a at the rate of 650 and 600 lbs./hr. respectively. A second catalyst solution (t-butyl perbenzoate as 2.3 weight percent solution in benzene) was injected at a rate of 0.14 lb./hr. into ethylene stream 47 through line 46. Ethylene stream 47 consisted of a flow rate 600 lbs./hr. of ethylene which was passed through sparger mixer 61 after the catalyst solution was injected in order to disperse the catalyst in the form of fine droplets in the ethylene stream. The ethylene stream was then passed into reactor 29 at injection point 69. A third catalyst solution, which was a 50:50 mixture by weight of two catalyst solutions (t-butyl perbenzoate as a 2.3 weight percent solution of benzene and t-butyl peroxide as a 1.2 weight percent solution in benzene) was injected at the rate of .04 lb./hr. into ethylene stream 45 through line 48. Ethylene stream 45 consisted of a throughput of 800 lbs./hr. After the catalyst was evenly dispersed in the ethylene stream by being passed through sparger mixer 59, the ethylene stream was divided into two equal portions of 400 lbs./hr. and the resulting streams injected into the reactor at injection points 67 and 65.

The ethylene containing polyethylene was periodically removed from the reactor by means of valve 77 to high pressure catch pot 21 where a major portion of the unpolymerized ethylene was removed through line 19. The remaining portion of ethylene with the product polyethylene was removed through line 79 by opening valve 81 into low pressure catch pot 13. In low pressure catch pot 13 the remainder of the unreacted ethylene was removed through line 11 and the polyethylene recovered from catch pot 13 after which it was ready for further processing. The product polymer had a density of .924, a melt index of 2, a percent haze of 9.0 and a molecular weight distribution ratio ($M_w/M_n$) of 57.

The telogen concentration in the reactor before and after each injection point was determined by sampling the polymerization mixture and was found not to be materially diminished by any incoropration of telogen into the polymer although the amount of ethylene was continuously being diminished by being converted to polyethylene. The results are illustrated in Table I below.

TABLE I

|  | Butane concentration, percent by vol. |
|---|---|
| Reactor inlet | 2.29 |
| Before first injection | 2.29 |
| After first injection | 2.27 |
| Before second injection | 2.35 |
| After second injection | 2.25 |
| Before third injection | 2.33 |
| After third injection | 2.26 |
| Before fourth injection | 2.34 |
| After fourth injection | 2.27 |
| Before fifth injection | 2.34 |
| After fifth injection | 2.28 |
| Before sixth injection | 2.34 |
| After sixth injection | 2.28 |
| Reactor outlet | 2.29 |

Figure 1:
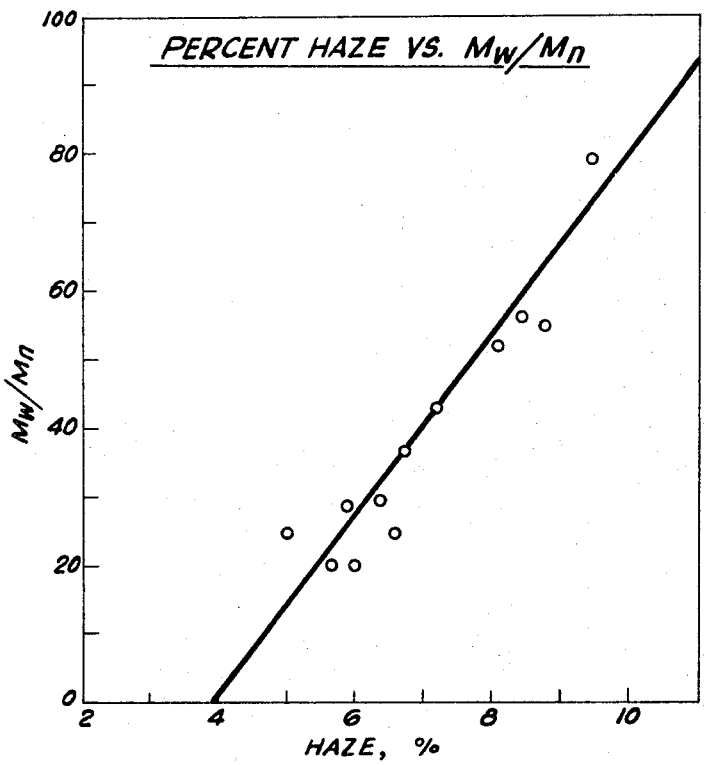
FIG. 1 is a graphic illustration of the relationship between haze and the molecular weight distribution of the polyethylene.
Figure 3:
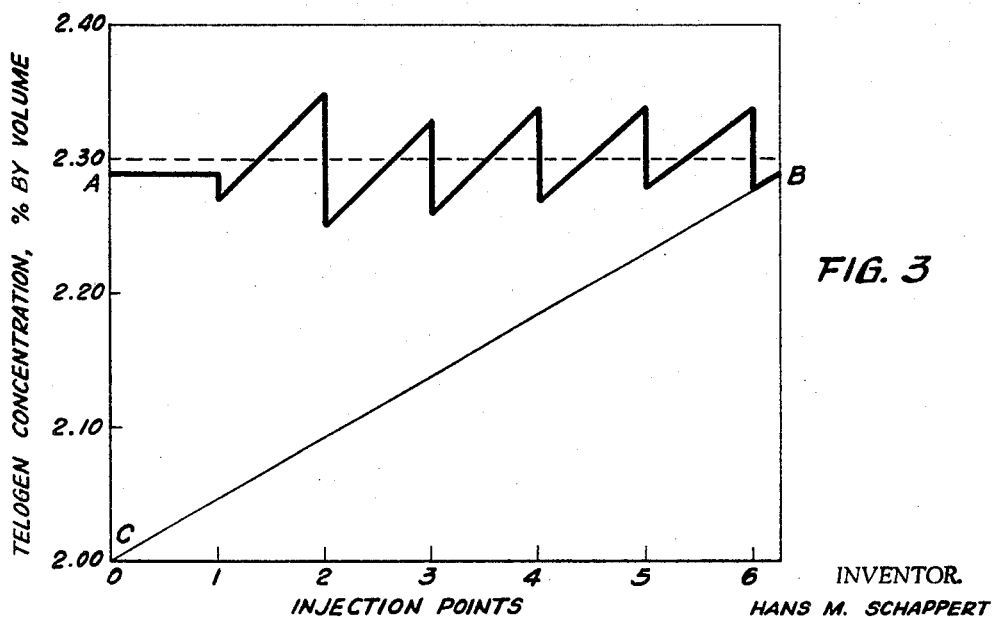
FIG. 3 is a graphic illustration of the telogen concentration at the various points in the reactor.

It can be seen that the variation between the maximum and minimum telogen concentrations is only 0.10 percent and the maximum deviation from the average telogen concentration throughout the reactor (2.30) was only .05. In a conventional reactor the telogen concentration gradually increases so that the concentration is much greater at the outlet end of the reactor. The difference is graphically illustrated in FIG. 3 where line AB represents the telogen concentration in the example. Line CB represents the telogen concentration variation in which all the ethylene contains 2 percent by volume telogen concentration and is fed to the inlet end of the reactor. It can be seen that the telogen concentration in this case gradually increases to 2.3 percent by volume telogen or an increase of 0.3 percent.

The foregoing has described a process whereby polyethylene having excellent optical and other physical properties can be produced. This is accomplished by providing a method and apparatus whereby the telogen level in the reactor is maintained essentially constant. This results in the aforementioned benefits in physical properties because of the ability to produce a polymer having an extremely narrow molecular weight distribution.

I claim:

1. In the polymerization of ethylene in a tubular reactor at maximum operating temperatures of 220–300° C. and pressures of 15,000–50,000 p.s.i.g. in the presence of a telogen and sufficient free radical yielding catalyst to initiate polymerization and maintain a predetermined temperature and pressure within the above indicated ranges, the improvement comprising dividing the ethylene into two portions, adjusting the telogen concentrations in each portion such that the second portion contains a lower telogen concentration than the first portion, heating said first portion to a temperature sufficient to initiate the polymerization of ethylene to polyethylene and injecting said second portion into said first portion at successive spaced points such that as the telogen concentration in said first portion tends to rise due to the polymerization of ethylene to polyethylene the telogen concentration is maintained essentially constant by the introduction of said second portion containing said lower concentration of telogen.

2. The improvement in the polymerization of ethylene in an extended polymerization zone in the presence of a free radical yielding catalyst and a telogen which comprises dividing the ethylene to be polymerized into two portions, adjusting the telogen concentration in each portion such that the second portion contains a lower telogen concentration that the first portion, heating said first portion to a temperature sufficient to initiate the polymerization of ethylene to polyethylene and injecting said second portion into said first portion at successive spaced points along said polymerization zone such that as the polymerization of ethylene to polyethylene proceeds and the telogen concentration in said first portion tends to rise the telogen concentration is maintained essentially constant by the introduction of said second portion containing said lower concentration of telogen.

3. In the polymerization of ethylene by the use of a free radical yielding catalyst and with a telogen in a tubular reactor at pressures of 15,000–50,000 p.s.i.g. the improvement comprising means for dividing the ethylene into two portions, means for adjusting the telogen concentration in each portion such that the second portion contains a lower telogen concentration than the first portion, means for heating said first portion to a temperature of from 220–330° C. for the polymerization of ethylene to polyethylene and means for injecting said second portion into said first portion at successive spaced points such that as the telogen concentration in said first portion tends to rise due to the polymerization of ethylene to polyethylene the telogen concentration is maintained essentially constant by the introduction of said second portion containing said lower concentration of telogen.

4. In the polymerization of ethylene in a tubular reactor at maximum operating temperatures of 220–300° C. and pressures of 15,000–50,000 p.s.i.g. in the presence of from 0.5–10 percent by volume based on ethylene a telogen and from 0.1–15 parts by weight per million based on ethylene of a free radical yielding catalyst the improvement comprising means for dividing the ethylene into two portions, means for adjusting the telogen concentration in each portion such that the second portion contains a lower telogen concentration than the first portion, means for heating said first portion to a temperature of between 120–190° C. to initiate the polymerization of ethylene to polyethylene and means for cooling said second portion of said ethylene to from 0–50° C., means for injecting said second portion into said first portion at from 2 to 10 spaced points such that as the telogen concentration in said first portion tends to rise due to the polymerization of ethylene to polyethylene the telogen concentration is maintained essentially constant by the introduction of said second portion containing said lower concentration of telogen.

5. A process for polymerizing ethylene to produce polyethylene of uniform molecular weight comprising compressing the ethylene to a pressure of from 15,000–50,000 p.s.i.g., dividing said ethylene into two portions, a recycle gas portion and a cold gas portion, such that the weight ratio of the recycle gas portion to the cold gas portion is between 9:1 and 1:5, mixing a telogen with said recycle gas portion such that said recycle gas portion has a predetermined telogen content of from 0.5 to 10 percent by volume based on ethylene, heating said recycle gas portion to a temperature of from 120–190° C. to initiate polymerization, flowing said recycle gas portion through an extended reaction zone at a maximum temperature of from 220–300° C. so that portions of said ethylene polymerize and the telogen content of the remainder of said ethylene tends to rise, mixing a telogen with said cold gas portion in an amount such that said cold gas portion has a telogen content less than said predetermined telogen content, cooling said cold gas portion to a temperature of from 0–50° C., dividing said cold gas portion into from 2–10 streams, introducing sufficient free radical yielding catalyst into said streams to provide a catalyst content of from 0.1–15 parts by weight per million based on the total weight of ethylene in said portions and injecting said streams into said reaction zone at spaced locations along said zone so as to maintain said predetermined telogen content.

6. An apparatus for polymerizing ethylene to produce polyethylene of uniform molecular weight comprising means for compressing the ethylene to a pressure of from 15,000 to 50,000 p.s.i.g., means for dividing said ethylene into two portions, a recycle gas portion and a cold gas portion, such that the weight ratio of the recycle gas portion to the cold gas portion is between 9:1 and 1:5, means for mixing a telogen with said recycle gas portion such that said recycle gas portion has a predetermined telogen content of from 0.5 to 10 percent by volume based on ethylene, a tubular reactor said reactor comprising a preheating and a polymerization section, means for flowing said recycle gas portion to the preheating section of said reactor, means for heating said recycle gas portion in said preheating section to a temperature of from 120 to 190° C. in initiate polymerization, means for maintaining said ethylene at a maximum temperature of from 220 to 300° C. in said polymerization section such that portions of said ethylene polymerize and the telogen content of the remainder of said ethylene tends to rise, means for mixing a telogen with said cold gas portion in an amount such that said cold gas portion has a telogen content less than said predetermined telogen content, means for cooling said cold gas portion to a temperature of from 0 to 50° C., means for dividing said cold gas portion into from 2 to 10 streams, means for introducing sufficient free radical yielding catalyst into said streams to provide a catalyst content of from 0.1 to 15 parts by weight per million based on the total weight of ethylene in said portions and means for flowing said streams into said reactor at spaced injection points along said reactor so as to maintain said predetermined telogen content.

References Cited
UNITED STATES PATENTS 3,119,804  1/1964  Harlow _____ 260—94.9

FOREIGN PATENTS 915,240  1/1963  Great Britain.

JOSEPH L. SCHOFER, *Primary Examiner.*

M. B. KURTZMAN, *Assistant Examiner.*